(12) United States Patent
Zhao et al.

(10) Patent No.: US 12,352,999 B2
(45) Date of Patent: Jul. 8, 2025

(54) DISPLAY DEVICE AND AN ELECTRONIC DEVICE

(71) Applicants: BEIJING BOE DISPLAY TECHNOLOGY CO., LTD., Beijing (CN); BOE TECHNOLOGY GROUP CO., LTD., Beijing (CN)

(72) Inventors: Tanhong Zhao, Beijijng (CN); Xuefei Qin, Beijijng (CN); Yawei Chen, Beijijng (CN); Guojian Qu, Beijijng (CN); Gang Li, Beijijng (CN); Qiaoke Zhou, Beijijng (CN); Liang Bo, Beijijng (CN)

(73) Assignees: BEJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/551,530

(22) PCT Filed: Oct. 22, 2021

(86) PCT No.: PCT/CN2021/125884
§ 371 (c)(1),
(2) Date: Sep. 20, 2023

(87) PCT Pub. No.: WO2022/247124
PCT Pub. Date: Dec. 1, 2022

(65) Prior Publication Data
US 2024/0168219 A1    May 23, 2024

(30) Foreign Application Priority Data
May 28, 2021 (CN) .......................... 202110594972.8

(51) Int. Cl.
*F21V 8/00* (2006.01)
*G02F 1/133* (2006.01)
(Continued)

(52) U.S. Cl.
CPC .......... *G02B 6/0088* (2013.01); *G02B 6/0021* (2013.01); *G02F 1/13306* (2013.01); *G02F 1/133308* (2013.01); *G02F 1/13458* (2013.01)

(58) Field of Classification Search
CPC ........... G02F 1/13306; G02F 1/133308; G02F 1/13458; G02B 6/0021; G02B 6/0088
See application file for complete search history.

(56) References Cited

U.S. PATENT DOCUMENTS

2012/0026653 A1   2/2012   Zhou
2013/0063681 A1   3/2013   Zhou
(Continued)

FOREIGN PATENT DOCUMENTS

CN    1924663 A    3/2007
CN    101761830 A    6/2010
(Continued)

OTHER PUBLICATIONS

Innovation Q+ NPL Search (Year: 2024).*
(Continued)

*Primary Examiner* — Anabel Ton
(74) *Attorney, Agent, or Firm* — Calfee, Halter & Griswold LLP

(57) ABSTRACT

The present disclosure relates to a display device with an outer contour of a polygon. The display device includes: a display panel; a functional panel on a side of a light exiting surface of the display panel; a first circuit board electrically connected to the display panel and bent at a first edge of the polygon to a side of the display panel away from the light exiting surface of the display panel; and a second circuit (Continued)

board electrically connected to the functional panel and bent at a second edge of the polygon to the side of the display panel away from the light exiting surface of the display panel, wherein the first edge and the second edge are different edges, and an orthographic projection of the first circuit board on the light exiting surface of the display panel does not overlap with an orthographic projection of the second circuit board on the light exiting surface of the display panel.

19 Claims, 10 Drawing Sheets

(51) Int. Cl.
  *G02F 1/1333*   (2006.01)
  *G02F 1/1345*   (2006.01)

(56) References Cited

U.S. PATENT DOCUMENTS

| | | |
|---|---|---|
| 2015/0331179 A1 | 11/2015 | Li |
| 2017/0235183 A1 | 8/2017 | Chen et al. |
| 2017/0351019 A1 | 12/2017 | Kadowaki et al. |
| 2018/0031898 A1 | 2/2018 | Tanaka et al. |
| 2018/0177056 A1 | 6/2018 | Chen |
| 2019/0029372 A1 | 1/2019 | Zhang et al. |
| 2019/0220122 A1 | 7/2019 | Shin |
| 2020/0026391 A1 | 1/2020 | Tomokawa |
| 2020/0169623 A1 | 5/2020 | Shin |

FOREIGN PATENT DOCUMENTS

| | | | |
|---|---|---|---|
| CN | 102297368 A | | 12/2011 |
| CN | 103635010 A | | 3/2014 |
| CN | 105182591 A | | 12/2015 |
| CN | 106413238 A | | 2/2017 |
| CN | 107408360 A | * | 11/2017 ............ G02B 6/005 |
| CN | 107820404 A | | 3/2018 |
| CN | 108008575 A | | 5/2018 |
| CN | 110033700 A | | 7/2019 |
| CN | 110441959 A | | 11/2019 |
| CN | 110737369 A | | 1/2020 |
| CN | 111211146 A | | 5/2020 |
| CN | 113744667 A | * | 12/2021 |
| CN | 116072012 A | * | 5/2023 |
| KR | 10-2014-0097857 A | | 8/2014 |
| WO | 2014/061469 A1 | | 4/2014 |

OTHER PUBLICATIONS

International Preliminary Report on Patentability received for PCT Patent Application No. PCT/CN2021/125884, mailed on Dec. 7, 2023, 9 pages (5 pages of English Translation and 4 pages of Original Document).

International Search Report and Written Opinion received for PCT Patent Application No. PCT/CN2021/125884, mailed on Feb. 21, 2022, 12 pages (5 pages of English Translation and 7 pages of Original Document).

Supplementary Partial European Search Report and Search Opinion received for European Application No. 21942688.9, mailed on Sep. 3, 2024, 14 pages.

Communication from Euripean Application No. 21942688.9 dated Mar. 13, 2025.

* cited by examiner

DISPLAY DEVICE AND AN ELECTRONIC DEVICE

RELATED APPLICATIONS

The present application is a 35 U.S.C. 371 national stage application of PCT International Application No. PCT/CN2021/125884 filed on Oct. 22, 2021, which claims the priority of the Chinese patent application No. CN202110594972.8 filed on May 28, 2021, the entire disclosures of which are incorporated herein by reference.

TECHNICAL FIELD

The present disclosure relates to the display technology, in particular to a display device and an electronic device comprising the display device.

BACKGROUND

Small size display devices with touch function are widely used in white appliances such as water dispensers, washing machines, refrigerators. By applying touch display devices in household appliances, it greatly facilitates people's lives and improves user experience. For LCD display modules, as they do not have touch function, it is necessary to add a touch panel to achieve touch function. Therefore, it is necessary to design LCD panels, touch panels, and their corresponding flexible circuit boards (FPCs) reasonably.

SUMMARY

According to an aspect of the present disclosure, a display device with an outer contour of a polygon is provided. The display device comprises: a display panel; a functional panel on a side of a light exiting surface of the display panel; a first circuit board electrically connected to the display panel and bent at a first edge of the polygon to a side of the display panel away from the light exiting surface of the display panel; and a second circuit board electrically connected to the functional panel and bent at a second edge of the polygon to the side of the display panel away from the light exiting surface of the display panel, wherein the first edge and the second edge are different edges, and an orthographic projection of the first circuit board on the light exiting surface of the display panel does not overlap with an orthographic projection of the second circuit board on the light exiting surface of the display panel.

In some embodiments, the first circuit board comprises a first lead portion, the second circuit board comprises a second bending portion and a second lead portion, and the second bending portion is close to the second edge; wherein the first lead portion extends in a same direction as the second lead portion.

In some embodiments, an extension direction of the first lead portion is perpendicular to the first edge, and an extension direction of the second bending portion is perpendicular to the second edge.

In some embodiments, the second circuit board further comprises an electronic device carrying portion, one end of the electronic device carrying portion is electrically connected to the second bending portion, and the other end is electrically connected to the second lead portion.

In some embodiments, a side of the second lead portion close to the display panel comprises a first anti electromagnetic interference layer, and/or, a side of the second bending portion close to the display panel comprises a second anti electromagnetic interference layer.

In some embodiments, the polygon is an octagon.

In some embodiments, a display area of the display panel is circular.

In some embodiments, the display panel comprises a liquid crystal display panel, wherein the display device further comprises a backlight plate on the side of the display panel away from the light exiting surface.

In some embodiments, the backlight plate comprises a rubber frame and a back plate, and the rubber frame is on a side of the back plate facing the display panel.

In some embodiments, the rubber frame and back plate are integrally formed through an inser-molding injection process.

In some embodiments, the back plate comprises a back plate substrate and a flange adjacent to an edge of the back plate substrate, wherein the flange corresponds to at least one edge of the outer contour of the polygon.

In some embodiments, the back plate substrate comprises a plurality of first through holes, each first through hole is filled with a first filling portion, a material of the first filling portion is the same as a material of the rubber frame, and the first filling portion and the rubber frame form an integrated structure, and/or the flange comprises a plurality of second through holes, each second through hole is filled with a second filling portion, a material of the second filling portion is the same as the material of the rubber frame, and the second filling portion and the rubber frame form an integrated structure.

In some embodiments, the display device comprises: a first groove and a second groove surrounded by the rubber frame, and an opening surface of the first groove and a bottom surface of the second groove are coplanar.

In some embodiments, the rubber frame is provided with a plurality of third through holes.

In some embodiments, the backlight plate comprises a backlight, and the backlight is arranged in the first groove.

In some embodiments, the backlight comprises a plurality of first light sources and a light guide plate, orthographic projections of the light guide plate and the plurality of first light sources on the back plate substrate do not overlap, the plurality of first light sources are a side of the first edge, and the plurality of first light sources are sequentially arranged in a direction parallel to the first edge.

In some embodiments, a part of the rubber frame adjacent to the first edge comprises at least one convex portion, and the convex portion protrudes towards a direction away from the first edge; at least one of the plurality of first light sources is limited by the nearest convex portion.

In some embodiments, the backlight plate further comprises a reflector, the reflector is on a side of the backlight facing the back plate substrate, wherein a part of the reflector adjacent to the first edge comprises at least one concave portion, and the at least one concave portion is limited by a corresponding convex portion.

In some embodiments, the backlight plate further comprises a diffuser, a prism, and a DBEF arranged sequentially in a light output direction of the light guide plate.

In some embodiments, the diffuser comprises a diffuser body and a diffuser flange at an edge of the diffuser body, wherein a thickness of the diffuser flange is greater than or equal to a thickness of the prism, or, the thickness of the diffuser flange is greater than or equal to a sum of the thickness of the prism and the DBEF.

In some embodiments, the diffuser, the prism, and the DBEF are all arranged in the second groove.

In some embodiments, the light guide plate, the reflector, the diffuser, the prism, and the DBEF each has a shape that matches the second groove, and there is a gap between them and the rubber frame.

In some embodiments, an orthographic projection of the first groove and/or the second groove on the back plate has a shape similar to a hot-air balloon.

In some embodiments, the rubber frame is provided with a first opening at the first edge, and the first circuit board is electrically connected to the display panel through the first opening.

In some embodiments, the rubber frame comprises a top surface of the rubber frame, in a plane parallel to the back plate substrate, along a direction perpendicular to an edge of the polygon, the top surface of the rubber frame has at least a first thickness and a second thickness; wherein the first thickness is greater than the second thickness; the distribution position of the second thickness on the rubber frame is closer to the vertices of the polygon compared to the first thickness.

In some embodiments, a light shading sheet is provided on a side of the plurality of the first light sources away from the back plate substrate, an orthographic projection of the light shading sheet on the back plate substrate covers an orthographic projection of the plurality of first light sources on the back plate substrate, and the orthographic projection of the first groove on the back plate substrate is within an orthographic projection of the second groove on the back plate substrate, a part of the light shading sheet is attached to the bottom surface of the second groove.

In some embodiments, a conductive tape is provided on a side of the plurality of first light sources away from the back plate substrate.

According to another aspect of the present disclosure, an electronic device is provided, which comprises a display device as described above.

BRIEF DESCRIPTION OF THE DRAWINGS

In order to more clearly illustrate the technical solutions in embodiments of the disclosure or in the prior art, the appended drawings needed to be used in the description of the embodiments or the prior art will be introduced briefly in the following. Obviously, the drawings in the following description are only some embodiments of the disclosure, and for those of ordinary skills in the art, other drawings may be obtained according to these drawings under the premise of not paying out creative work.

Figure 1:
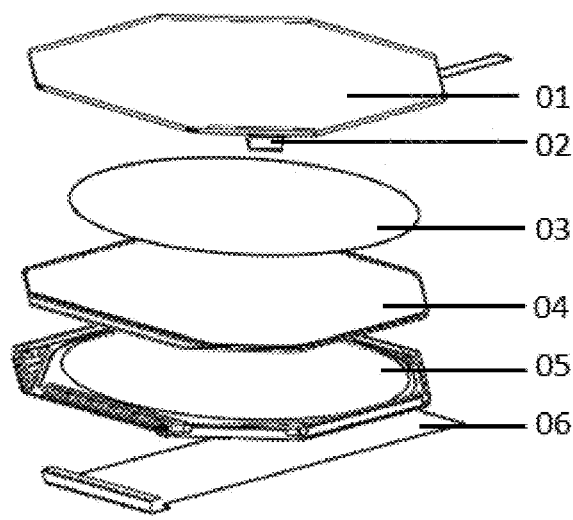
FIG. 1 schematically shows an exploded view of a display device according to an embodiment of the present disclosure.

The shape and size of each part in the drawings do not reflect real scale of each part, but to schematically illustrate the content of the disclosure.

DETAILED DESCRIPTION OF THE DISCLOSURE

In the following, the technical solutions in the embodiments of the disclosure will be described clearly and completely in connection with the drawings in the embodiments of the disclosure. Obviously, the described embodiments are only part of the embodiments of the disclosure, and not all of the embodiments. Based on the embodiments in the disclosure, all other embodiments obtained by those of ordinary skills in the art under the premise of not paying out creative work pertain to the protection scope of the disclosure.

According to a first aspect of the present disclosure, a display device with an outer contour of a polygon is provided. The display device comprises: a display panel; a functional panel on a side of a light exiting surface of the display panel; a first circuit board electrically connected to the display panel and bent at a first edge of the polygon to a side of the display panel away from the light exiting surface of the display panel; and a second circuit board electrically connected to the functional panel and bent at a second edge of the polygon to the side of the display panel away from the light exiting surface of the display panel, wherein the first edge and the second edge are different edges, and an orthographic projection of the first circuit board on the light exiting surface of the display panel does not overlap with an orthographic projection of the second circuit board on the light exiting surface of the display panel.

In the present disclosure, a polygon may be, for example, a triangle, a quadrangle, a pentagon, a hexagon, an octagon. Preferably, the polygon is an axisymmetric figure for aesthetic purposes. Further preferably, the polygon is a centrosymmetric figure. In the present disclosure, the polygon can be a rectilinear polygon, a rounded polygon, or a part of the vertex positions of the polygon can be set to be rounded. A rectilinear polygon is a polygon in the conventional sense, where all edges of the polygon are line segments.

In the present disclosure, the display panel may be, for example, a liquid crystal display panel, an OLED display panel. In order to facilitate the bending operation, the first circuit board may be a first flexible circuit board, and the second circuit board may be a second flexible circuit board. In the following embodiments and drawings, the polygon is an octagon, the display panel is a liquid crystal display panel, and the first circuit board and the second circuit board are flexible circuit boards. This does not mean that this is a limitation of the present disclosure.

FIG. 1 schematically shows an exploded view of a display device according to an embodiment of the present disclosure. As shown in FIG. 1, the display device may be arranged from top to bottom as follows: a function panel 01; a second flexible circuit board 02 electrically connected to the functional panel 01, the second flexible circuit board 02 is connected at an edge of the functional panel 01 and bent to a side of the backlight plate 05 away from the display panel; an optical transparent adhesive (OCA) 03 for adhering the functional panel 01 and the display panel 04; a display panel 04; a backlight plate 05 on a side of the display panel 04 away from the light exiting surface of the display panel; a first flexible circuit board 06 electrically connected to the display panel 04, the first flexible circuit board is connected at the other edge of the display panel 04 and bent to a side of the backlight plate 05 away from the display panel.

It should be noted that in order to avoid obstructing other components, in FIG. 1, the flexible circuit board 02 electrically connected to the functional panel is schematically shown below the functional panel 01. In actual products, the flexible circuit board 02 is bent onto the backlight plate 05, as shown more clearly in the figures below.

In the present disclosure, a functional panel is a panel arranged above a display panel to achieve specific functions, such as a touch panel, an infrared control panel. In the following, the function panel is a touch panel as an example. A touch panel usually includes a glass layer and a sensor layers. For example, tempered glass with a thickness of 0.8 mm and a surface hardness of 7 H can be selected to ensure the reliability of the touch panel.

Figure 2:
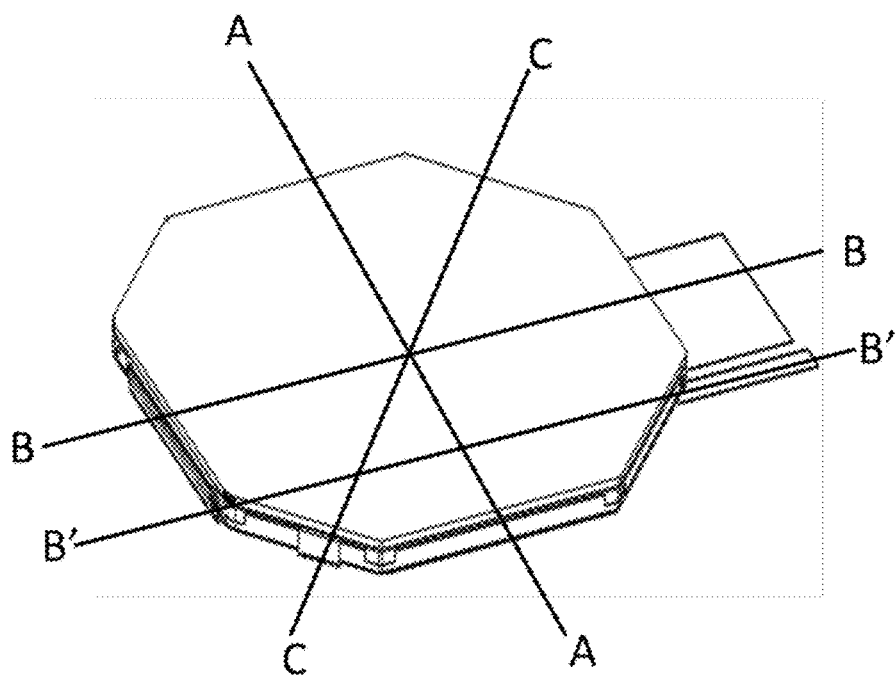
FIG. 2 schematically shows a three-dimensional view of a display device according to an embodiment of the present disclosure.
Figure 3A:
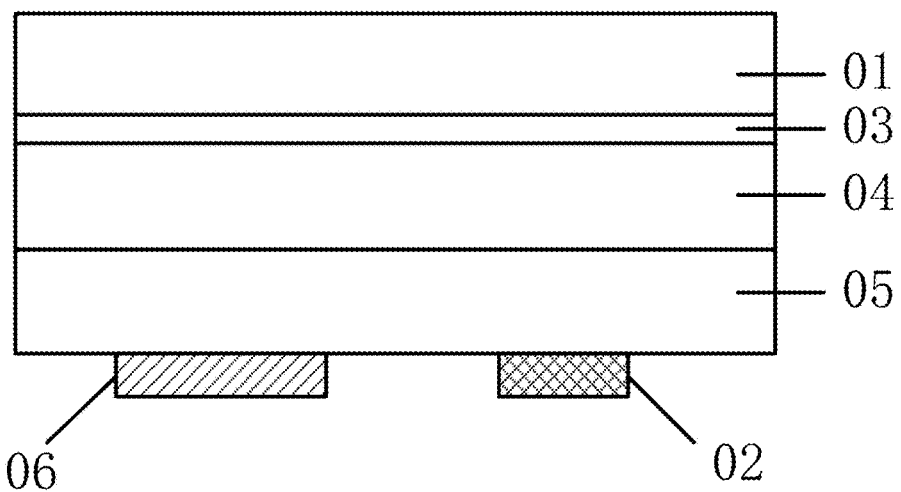
FIG. 3A schematically shows a cross-sectional view of the display device taken along the AA line in FIG. 2.
Figure 3B:
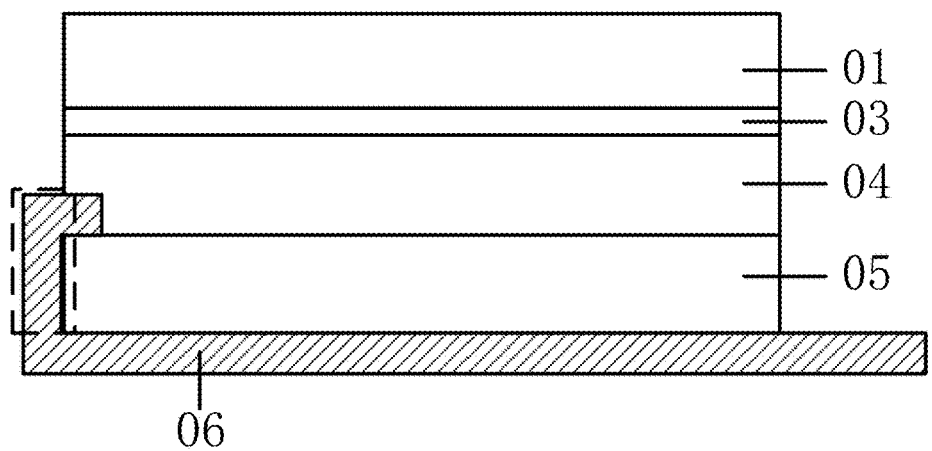
FIG. 3B schematically shows a cross-sectional view of the display device taken along the BB line in FIG. 2.
Figure 3C:
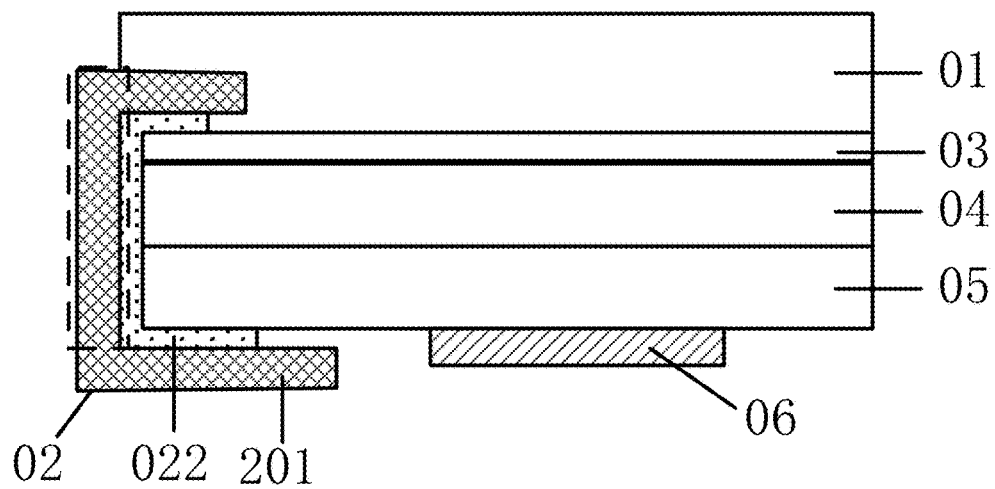
FIG. 3C schematically shows a cross-sectional view of the display device taken along the CC line in FIG. 2.
Figure 3D:
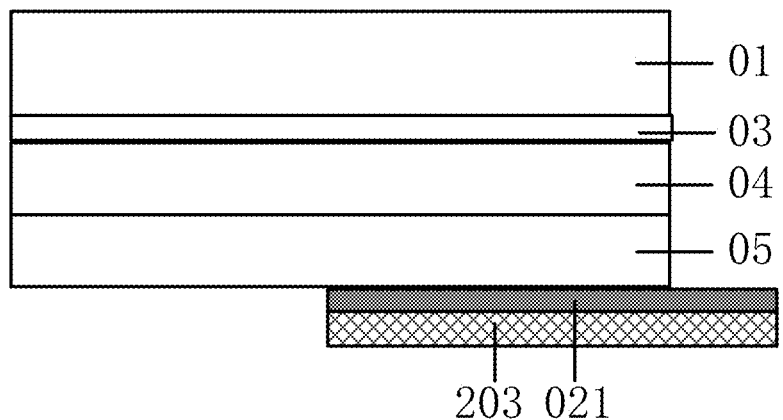
FIG. 3D schematically shows a cross-sectional view of the display device taken along the B'B' line in FIG. 2.

FIG. 2 schematically shows a three-dimensional view of a display device according to an embodiment of the present disclosure. FIG. 3A schematically shows a cross-sectional view of the display device taken along the AA line in FIG. 2. It can be seen that the second flexible circuit board 02 electrically connected to the touch panel 01 and the first flexible circuit board 06 electrically connected to the display panel 04 are both bent to the side of the backlight plate 05 away from the display panel. FIG. 3B schematically shows a cross-sectional view of the display device taken along the BB line in FIG. 2. The BB line passes through the first edge of the display device, as shown in FIG. 3B, the first flexible circuit board 06 is electrically connected to the display panel 04 and is bent at the first edge to the side of the backlight plate 05 away from the display panel. FIG. 3C schematically shows a cross-sectional view of the display device taken along the CC line in FIG. 2. The CC line passes through the second edge of the display device, and the second edge is adjacent to the first edge. As shown in FIG. 3C, the second flexible circuit board 02 is electrically connected to the touch panel 01 and bent at the second edge to the side of the backlight plate 05 away from the display panel. As the CC line only passes through a part of the second flexible circuit board, only a part of the second flexible circuit board is shown in the cross-sectional view of FIG. 3C (combined with FIG. 4 below, it will be clear that this part includes the second bending portion 201 of the second flexible circuit board). FIG. 3D schematically shows a cross-sectional view of the display device taken along the B'B' line in FIG. 2, with the B' B' line parallel to the BB line. The B'B' line passes through another part of the second flexible circuit board, and the cross-sectional view in FIG. 3D shows another part of the second flexible circuit board (combined with FIG. 4 below, it will be clear that this part includes the second lead portion 203 of the second flexible circuit board).

It should be noted that in the embodiments disclosed in the present disclosure, the first edge is directly adjacent to the second edge in the polygon, which is only illustrative and does not imply a limitation on the scope of protection of the present disclosure. In fact, as long as the first edge and the second edge are different edges of the polygon, those skilled in the art can make appropriate designs according to actual needs. Preferably, in order to ensure that the spatial arrangements of the first flexible circuit board and second flexible circuit board do not interfere with each other, when the number of edges of the polygon is even, the first edge and second edge are chosen as two edges that are not opposite. For example, when a polygon has n edges, the first edge number is set to be 1, and each edge is numbered clockwise, and the second edge is preferably chosen from the edges except the edge numbered (n/2)+1. In addition, the above-mentioned backlight plate is not necessary. For display devices without a backlight plate (such as OLED display devices, QLED display devices, Mini LED or Micro LED display devices), the first flexible circuit board and the second flexible circuit board may be bent to a side of the display panel away from the light exiting surface of the display panel.

Figure 4:
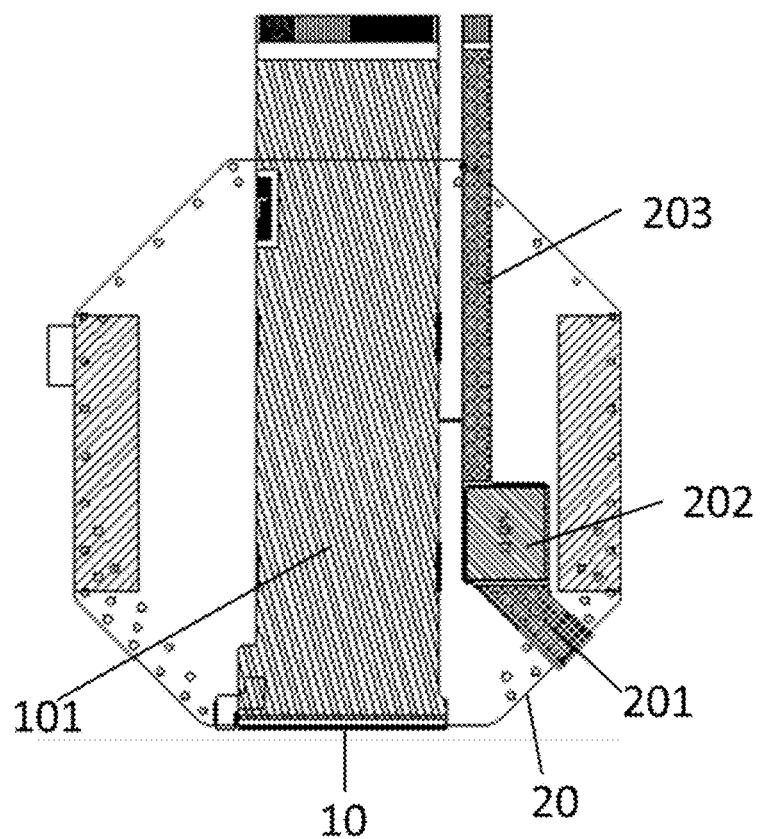
FIG. 4 schematically shows a top view of the back of the display device according to an embodiment of the present disclosure.

FIG. 4 schematically shows a top view of the back of the display device according to an embodiment of the present disclosure. As shown in FIG. 4, the first flexible circuit board 06 is bent to the side away from the light exiting surface of the display panel at the first edge 10, and the second flexible circuit board is bent to the side away from the light exiting surface of the display panel at the second edge 20. Moreover, an orthographic projection of the first flexible circuit board 06 on the backlight plate does not overlap with an orthographic projection of the second flexible circuit board on the backlight plate.

The first flexible circuit board and the second flexible circuit board do not overlap each other, which can avoid mutual interference between the display panel and touch panel during operation, ensuring stable display and touch functions.

As shown in FIG. 4, the first flexible circuit board includes a first lead portion 101, which is arranged on the side away from the light exiting surface of the display panel. The second flexible circuit board includes: a second bending portion 201 and a second lead portion 203, the second bending portion 201 is arranged on the side away from the light exiting surface of the display panel, close to the second edge 20, and can be arranged to extend in a direction perpendicular to the second edge 20. The display device may further include an electronic device carrying portion 202, one end of the electronic device carrying portion 202 is connected to the second bending portion 201; and the second lead portion 203 is connected to one end of the electronic device carrying portion 202 away from the second bending portion 201. The second lead portion 203 of the second flexible circuit board and the first lead portion 101 of the first flexible circuit board extend in the same direction. For example, in FIG. 4, the second lead portion 203 of the second flexible circuit board and the first lead portion 101 of the first flexible circuit board both extend in a direction perpendicular to and away from the first edge 10. The electronic device carrying portion 20 is used for arranging ICs and other components. For example, an outer contour of the electronic device carrying portion is a square, such as a square with an edge length within the range of 10 mm to 15 mm.

When the second bending portion 201 is perpendicular to the second edge 20, and the second lead portion 203 is perpendicular to the first edge 10, according to geometric relationships, the angle between the second bending portion 201 and the second lead portion 203 is equal to the angle between the first edge 10 and the second edge 20.

It should be noted that FIG. 4 is a top view of the back of the display device. In addition to the first lead portion 101 shown in FIG. 4, the first flexible circuit board can also include a bending portion bent on the side of the display device, as shown in the dashed box in FIG. 3B. In addition to the second bending portion 201, the electronic device carrying portion 202, and the second lead portion 203 shown in FIG. 4, the second flexible circuit board also includes a bending portion bent on the side of the display device, as shown in the dashed box in FIG. 3C.

Figure 5:
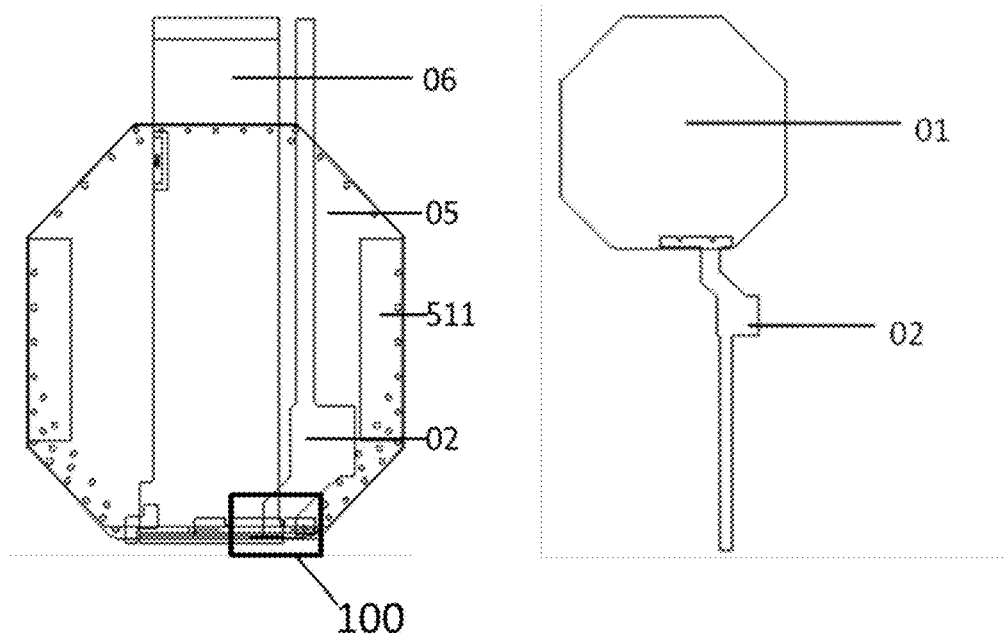
FIG. 5 shows a schematic diagram of the arrangement scheme of flexible circuit boards in related art.

In related art, each circuit board of a display device is usually led out from the same edge, which is a common design in small size display devices. FIG. 5 shows a schematic diagram of the arrangement scheme of flexible circuit boards in related art. The left side of FIG. 5 is a top view of the first flexible circuit board 06 and the second flexible circuit board 02 bent on the backlight plate 05, while the right side of FIG. 5 is a structural schematic diagram of the touch panel 01 and the second flexible circuit board 02 in a un-bended state. For small size display devices, when both the first flexible circuit board 06 and the second flexible circuit board 02 are arranged on the same edge of the display device, due to the limited length of one edge, there are overlapping areas between the first flexible circuit board and the second flexible circuit board 02 after bending, as shown in box 100 in FIG. 5. The overlap between the first flexible circuit board and the second flexible circuit board may lead to the risk of mutual interference between the display panel and touch panel during operation, affecting the display and touch functions. In addition, after the first flexible circuit board is bent on the backlight plate, the following bending operation of the second flexible circuit board becomes difficult due to the presence of the first flexible circuit board.

Figure 6:
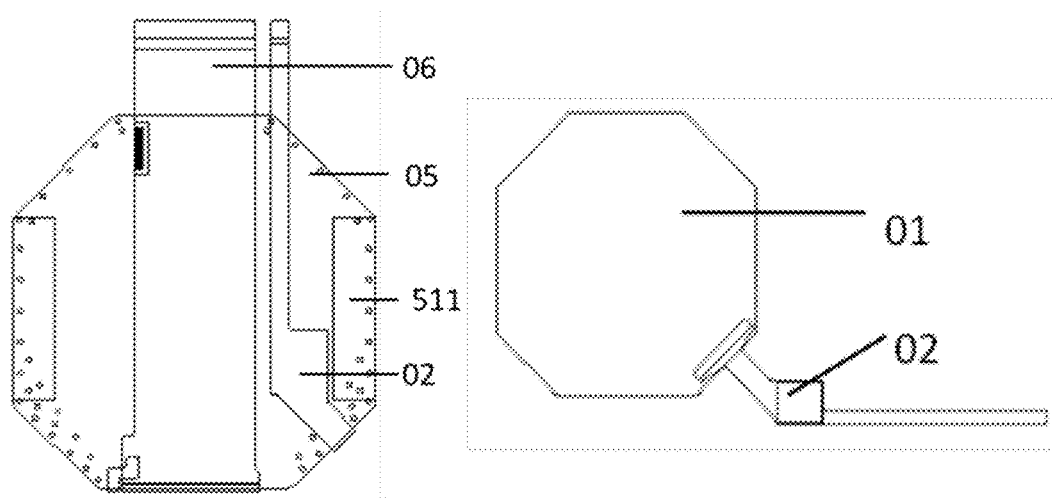
FIG. 6 shows a schematic diagram of the arrangement scheme of flexible circuit boards in the present disclosure.

FIG. 6 shows a schematic diagram of the arrangement scheme of flexible circuit boards in the present disclosure. The left side of FIG. 6 is a top view of the first flexible circuit board 06 and the second flexible circuit board 02 bent on the backlight plate 05, while the right side of FIG. 6 is a structural schematic diagram of the touch panel 01 and the second flexible circuit board 02 in a un-bended state. As shown in FIG. 6, the first flexible circuit board and the second flexible circuit board are respectively led out from two adjacent edges of the display device. The structural design of the second flexible circuit board ensures that the two flexible circuit boards do not overlap after bending, which avoids mutual interference of signals between the display panel and touch panel during operation. Meanwhile, the second lead portion of the second flexible circuit board extends in the same direction as the first lead portion of the first flexible circuit board, which facilitates the subsequent connection of the two flexible circuit boards with other devices (such as controllers).

For example, the extension direction of the lead portion and the extension direction of the bending portion on the side away from the light exiting surface of the display panel may be the extension direction of most wires at corresponding positions on the circuit board.

For example, the extension direction of the lead portion and the extension direction of the bending portion on the side away from the light exiting surface of the display panel may be the extension direction of the longest line segment in the corresponding position of the circuit board's outer contour.

For example, the extension direction of the lead portion and the extension direction of the bending portion on the side away from the light exiting surface of the display panel may be the extension direction of a straight line obtained by selecting sampling points from all wires in the corresponding position of the circuit board at equal intervals and performing linear fitting on all sampling points.

It should be noted that the extension directions of the first lead portion and the second lead portion are the same includes the case where the extension directions of the first lead portion and the second lead portion are parallel. However, considering manufacturing errors and design flexibility, the extension directions of the first lead portion and the second lead portion are the same may also include the case where there is a certain small degree angle between the extension directions of the first lead portion and the second lead portion. For example, if the angle between the extension directions of the first lead portion and the second lead portion is less than or equal to 20°, it can also be considered that the extension directions of the first lead portion and the second lead portion are the same.

Figure 7:
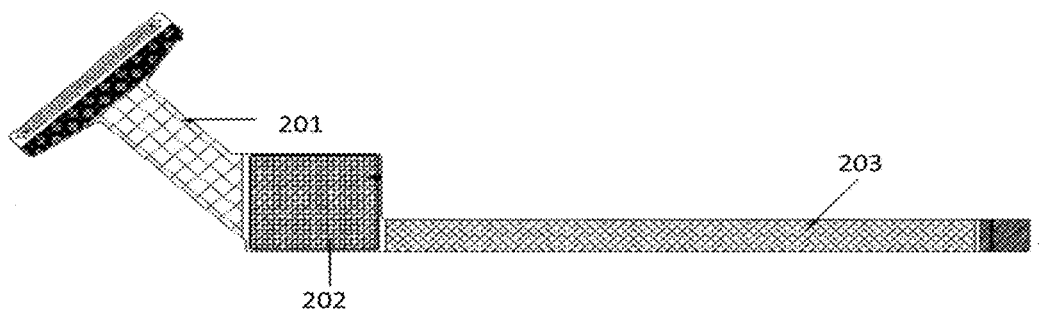
FIG. 7 schematically shows a structural diagram of a second flexible circuit board according to an embodiment of the present disclosure.

FIG. 7 schematically shows a structural diagram of a second flexible circuit board according to an embodiment of the present disclosure. A first anti electromagnetic interference layer may be arranged on the second lead portion 203 of the second flexible circuit board, or a second anti electromagnetic interference layer may be arranged on the second bending portion 201 of the second flexible circuit board. Combining FIG. 3C and FIG. 3D, for the bent second flexible circuit, the first anti electromagnetic interference layer 021 is arranged on the side of the second lead portion 203 close to the display panel, and the second anti electromagnetic interference layer 022 is arranged on the side of the second bending portion 203 close to the display panel. By arranging the first anti electromagnetic interference layer and second anti electromagnetic interference layer, electromagnetic interference can be effectively avoided, the risk of accidental triggering can be reduced, and the accuracy and stability of touch function can be improved. Optionally, the second anti electromagnetic interference layer can be made of materials with lower hardness, which facilitates the bending operation of the second bending portion.

Figure 8:
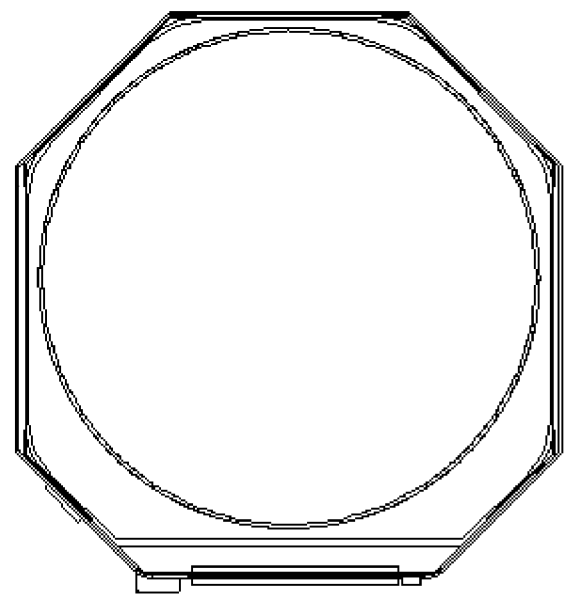
FIG. 8 schematically shows a top view of the front of the display device according to an embodiment of the present disclosure.

FIG. 8 schematically shows a top view of the front of the display device according to an embodiment of the present disclosure. As shown in FIG. 8, the outer contour of the display panel is an octagon, and the display area is circular, which is located in the center of the polygon display device. This arrangement makes good use of the polygonal space, and the non-display area is evenly distributed around the display area. The overall external structure of the display device is beautiful and symmetrical. The multiple edges of the polygon (for example, in this embodiment, there are 8 edges) provide multiple points for the limit fixation of the display device, ensuring the reliability of the display device in the entire machine. Meanwhile, in terms of manufacturing process, due to the straight edges of the polygon, the cutting of the glass shape is simpler compared to circular arcs. In specific embodiments, the diameter of the circular display area may be within the range of 60 mm to 70 mm, for example.

Figure 9:
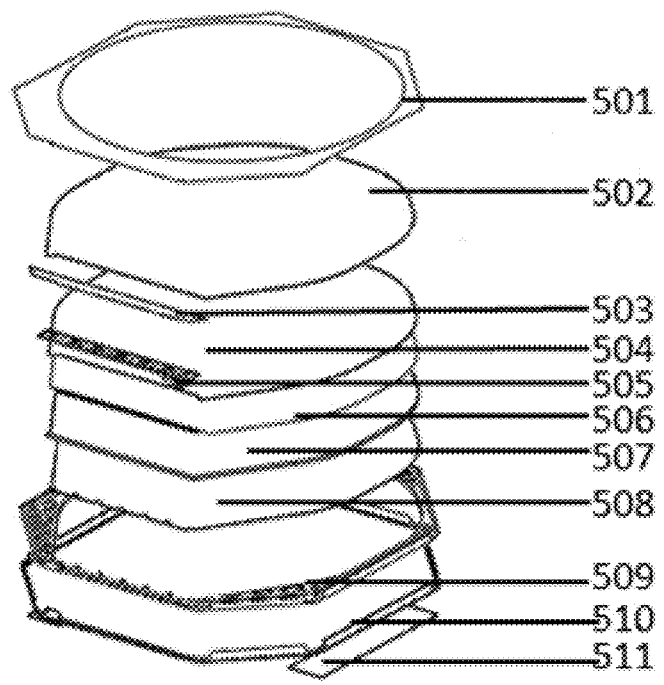
FIG. 9 schematically shows an exploded view of a backlight plate according to an embodiment of the present disclosure.
Figure 10A:
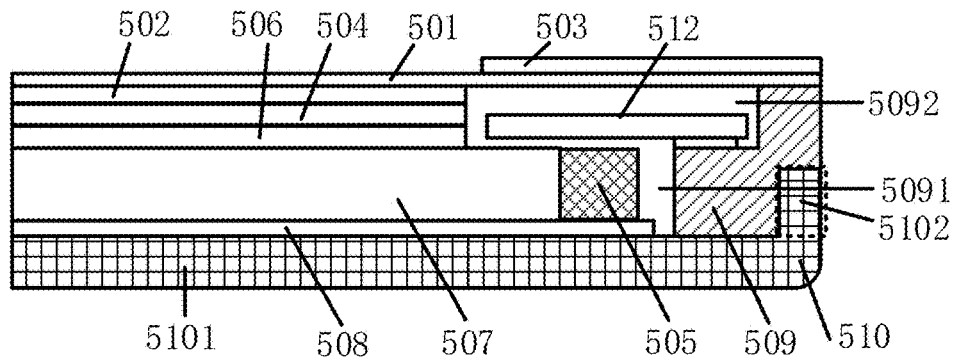
FIG. 10a schematically shows a cross-sectional view of a backlight plate according to an embodiment of the present disclosure.
Figure 10B:
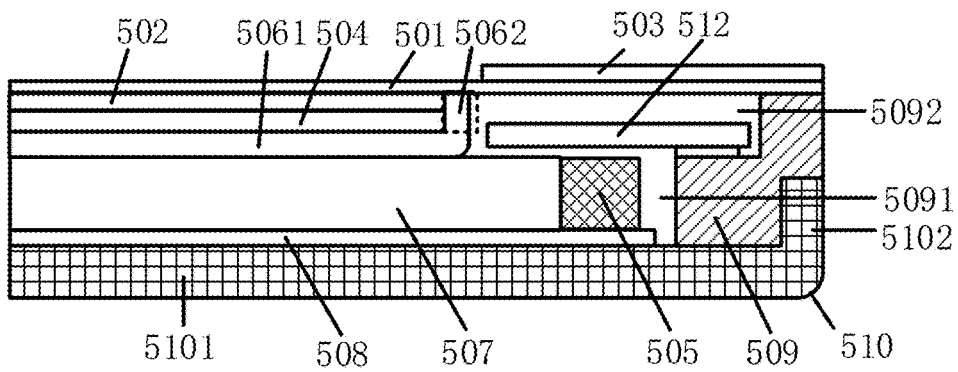
FIG. 10b schematically shows another cross-sectional view of a backlight plate according to an embodiment of the present disclosure.

According to a second aspect of the present disclosure, a backlight plate is also provided. FIG. 9 schematically shows an exploded view of a backlight plate according to an embodiment of the present disclosure. FIG. 10a and FIG. 10b schematically show cross-sectional views of a backlight plate according to embodiments of the present disclosure.

In some embodiments, as shown in FIG. 9 and FIG. 10a, the backlight plate includes a rubber frame 509 and a back plate 510, with the rubber frame 509 on the side of the back plate 510 facing the display panel.

In some embodiments, the rubber frame and back plate may be integrally formed through an inser-molding injection process. Compared with the snap (MNT structure) or adhesive tape (NB structure) fixation method, the integrated formed rubber frame and back plate through the inser-molding injection process is more firmly combined, while also avoiding the unevenness of the surface of the rubber frame when the backlight plate is assembled in the display device.

In some embodiments, as shown in FIG. 10a, the back plate 510 includes: a back plate substrate 5101, and a flange 5102 adjacent to the edge of the back plate substrate 5101 (as shown in the dashed box in FIG. 10a), which corresponds to at least one edge of the outer contour of the polygon. Preferably, the flange 5102 is essentially perpendicular to the back plate substrate 5101. The flange 5102 is essentially perpendicular to the back plate substrate 5101, and the wording "essentially" is to consider processing errors. Preferably, the angle between the flange 5102 and the back plate substrate 5101 is 90°. By arranging the flange, the bonding surface between the rubber frame and the back plate can be increased, making the bonding between the two more secure.

Figure 11:
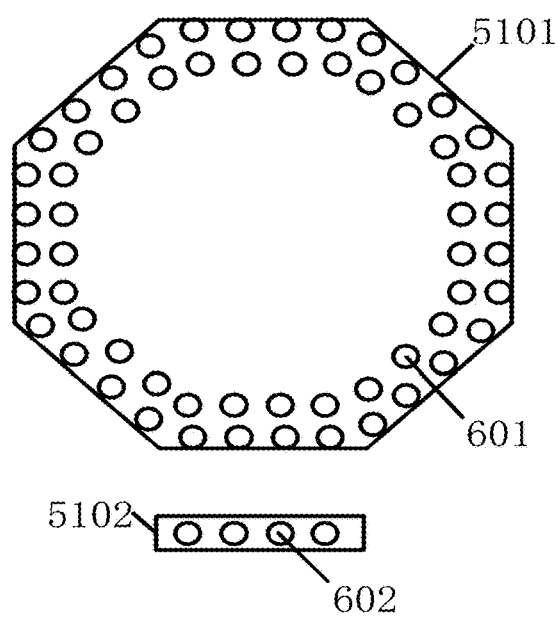
FIG. 11 schematically shows a top view of a back plate according to an embodiment of the present disclosure.

FIG. 11 schematically shows a top view of a back plate according to an embodiment of the present disclosure. In some embodiments, as shown in the upper part of FIG. 11, the back plate substrate 5101 may include a plurality of first through holes 601, each first through hole is filled with a first filling portion, a material of the first filling portion is the same as that of the rubber frame, and the first filling portion and the rubber frame form an integrated structure. Additionally or alternatively, as shown in the lower part of FIG. 11, the flange 5102 may include a plurality of second through holes 602, each second through hole is filled with a second filling portion, a material of the second filling portion is the same as the material of the rubber frame, and the second filling portion and the rubber frame form an integrated structure. The first through holes may, for example, penetrate the back plate substrate in a direction perpendicular to the back plate substrate. The second through holes may, for example, penetrate the flange in a direction perpendicular to the back plate substrate. The first through holes and the second through holes may be circular through holes (for example, as shown in FIG. 11), or may be any other shape of through holes, and the present disclosure is not limited thereto.

By arranging the first through holes and/or the second through holes, in the inser-molding injection process, liquid rubber quickly fills the small holes on the back plate under the injection pressure of the injection molding machine, thereby firmly integrating the rubber frame with the back plate.

In some embodiments, as shown in FIG. 10a, the display device includes a first groove 5091 and a second groove 5092 surrounded by the rubber frame, and the opening surface of the first groove 5091 and the bottom surface of the second groove 5092 are coplanar.

Figure 12:
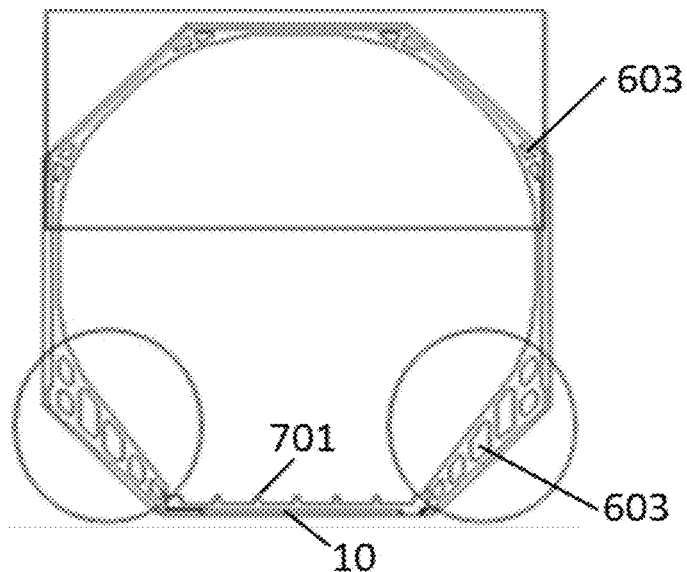
FIG. 12 schematically shows a top view of a rubber frame according an embodiment of the present disclosure.

FIG. 12 schematically shows a top view of a rubber frame according an embodiment of the present disclosure. In some embodiments, as shown in the box and circles of FIG. 12, the rubber frame is provided with a plurality of third through holes 603. In the in inser-molding injection process, these third through holes can be formed through the design of the mold. The wider part of the rubber frame has more and larger through holes, while the narrower part of the rubber frame has fewer and smaller through holes, which can make the wall thickness of the rubber frame more uniform. By designing a plurality of third through holes on the rubber frame, it can ensure that the wall thickness of each part of the rubber frame is uniform. When the rubber cools, it can maintain the same cooling speed to avoid surface shrinkage pits. Moreover, the porous design allows the rubber to quickly release stress during cooling, preventing deformation of the rubber frame. At the same time, this porous design can also save rubber consumption and cost.

In some embodiments, the backlight plate includes a backlight, which can be arranged in the first groove of the rubber frame, as shown in FIG. 10a. The backlight can be an edge-lit backlight, including the light source 505 and the light guide plate 507, wherein the light source 505 is arranged close to the light entrance surface of the light guide plate 507, and the light source is located on a side of the first edge. In some embodiments, the light source may be a single light strip. In some embodiments, the light source may be a plurality of discrete first light sources, and the orthographic projection of the light guide plate and the orthographic projections of the first light sources on the back plate substrate do not overlap. The plurality of first light sources are on the side of the first edge, and the plurality of first light sources are sequentially arranged in a direction parallel to the first edge. By using a plurality of discrete first light sources, each first light source can be individually controlled to increase the adjustability of the backlight. The plurality of first light sources are spaced without affecting each other, ensuring the stability of the backlight. Optionally, the plurality of first light sources are connected in series, and voltage can be supplied to the plurality of first light sources through the first flexible circuit board. Optionally, the connection mode between the plurality of first light sources may also include parallel connection, voltage can be supplied to the plurality of first light sources through the first flexible circuit board.

Figure 16:
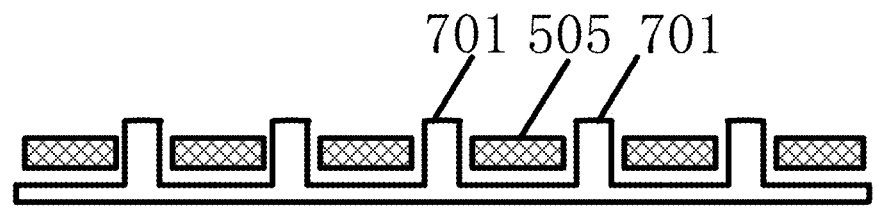
FIG. 16 schematically shows a top view of the light source and the convex portion of the rubber frame according to an embodiment of the present disclosure.

In some embodiments, as shown in FIG. 12, a part of the rubber frame adjacent to the first edge 10 includes at least one convex portion 701, the convex portion 701 protrudes towards a direction away from the first edge and at least one of the plurality of first light sources is limited by the nearest convex portion. In some embodiments, each of the plurality of first light sources mentioned above can be arranged between adjacent convex portions. FIG. 16 schematically shows a top view of the light source and a portion of the rubber frame, with an orthographic projection of each of the plurality of first light sources 505 on the back plate substrate located between orthographic projections of the corresponding two convex portions 701 on the back plate substrate During the assembly process of the backlight plate, these convex portions can effectively limit the position of the plurality of first light sources, and more accurately determine the positions of the plurality of first light sources.

In some embodiments, as shown in FIG. 9 and FIG. 10a, the backlight plate may also include a reflector 508 on a side of the light guide plate 507 facing the back plate substrate 5101. The reflector can redirect the light that fails to exit the light guide plate back to the light guide plate, so as to improve the light emission rate and the brightness of the backlight plate.

Figure 13:
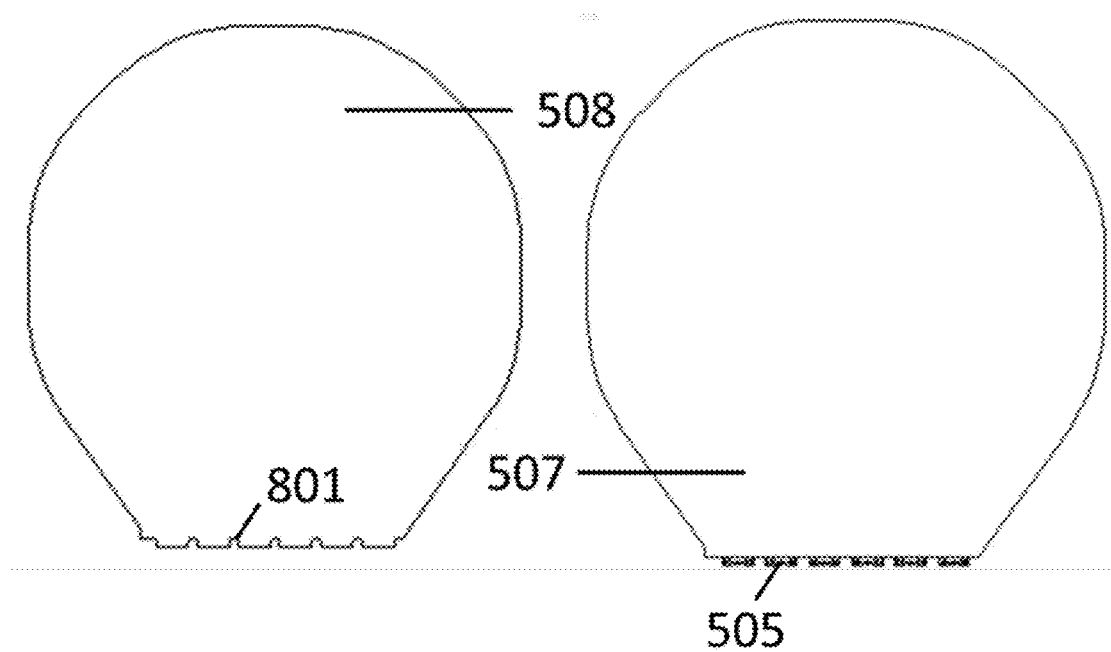
FIG. 13 schematically shows a top view of a light guide plate and a reflector according to an embodiment of the present disclosure.

In some embodiments, as shown in FIG. 13, the part of the reflector 508 adjacent to the first edge includes at least one concave portion 801, which is recessed into the reflector in a direction away from the first edge, and the at least one concave portion is limited by the corresponding convex portion. Optionally, the rubber frame includes a plurality of convex portions, and the reflector includes a plurality of concave portions. The shape and position of the plurality of concave portions match the shape and position of the plurality of convex portions of the rubber frame. The plurality of concave portions of the reflector can be embedded with the plurality of convex portions of the rubber frame, thereby limiting and fixing the reflector in the first groove of the rubber frame. Optionally, the orthographic projections of the plurality of concave portions on the back plate substrate can coincide with the orthographic projections of the plurality of convex portions of the rubber frame on the back plate substrate, and each of the plurality of first light sources can be arranged between the corresponding two concave portions. The concave portions of the reflector and the convex portions of the rubber frame limit the light source together, making the position of the light source more accurate.

In some embodiments, as shown in FIG. 9 and FIG. 10a, the backlight plate may also include a diffuser 506, a prism 504, and a reflective polarizing film (DBEF) 502 arranged sequentially in a light output direction of the light guide plate. The diffuser 506 diffuses the outgoing light of the light guide plate, making the outgoing light distribution of the backlight plate more uniform; the prism 504 can improve the brightness of the front outgoing light of the backlight plate; the DBEF 502 can further increase the light efficiency of the backlight plate, resulting in a 30%-40% increase in its output brightness.

Figure 14:
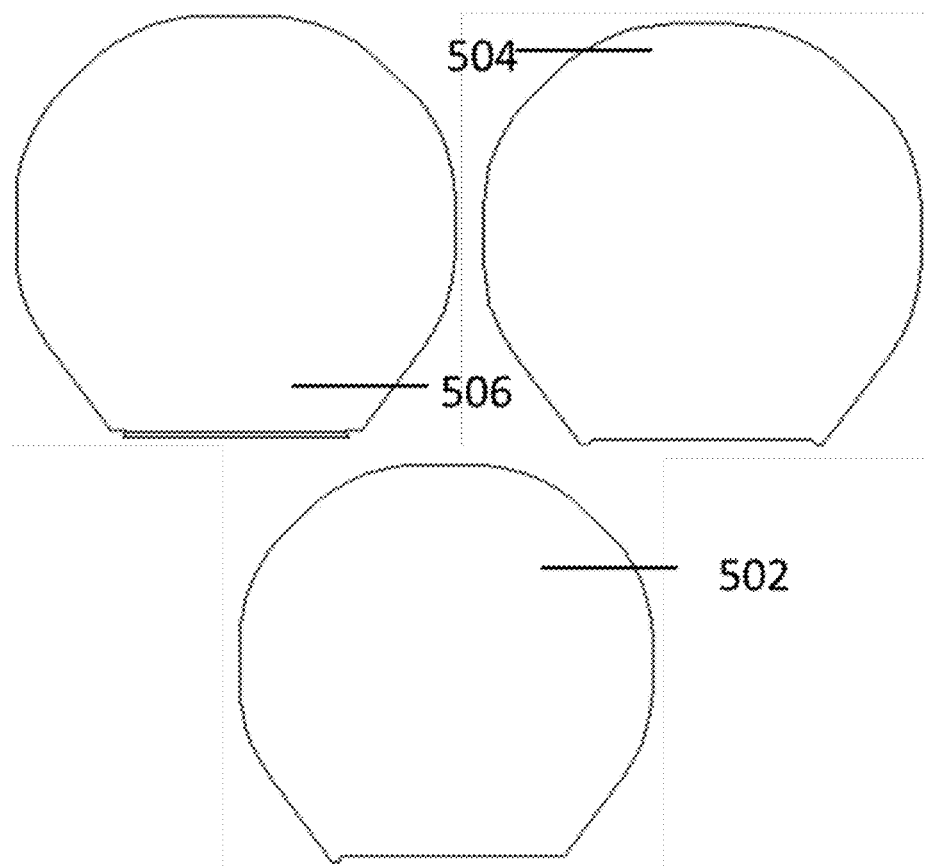
FIG. 14 schematically shows shapes of a diffuser, a prism, and a DBEF according to an embodiment of the present disclosure.

As shown in FIG. 9 and FIG. 14, for the diffuser, the prism, and the DBEF, except for the part near the first edge, the other parts can have essentially the same contour. Preferably, at the position near the first edge, at least one of the diffuser, the prism and the DBEF can be designed for foolproof. As shown in FIG. 10a and FIG. 10b, the diffuser, the prism, and the DBEF may all be arranged in the second groove 5092.

In some embodiments, as shown in FIG. 10b, the diffuser may include a diffuser body 5061 and a diffuser flange 5062 at the edge of the diffuser body (as shown in the dashed box in FIG. 10b). Preferably, a thickness of the diffuser flange 5062 is greater than or equal to a thickness of the prism 504. Optionally, the thickness of the diffuser flange 5062 is greater than or equal to the sum of the thicknesses of the prism 504 and the DBEF 502.

In some embodiments, an orthographic projection of the first groove on the back plate has a shape similar to a hot-air balloon, as shown in FIG. 12. Except for the part near the first edge, the shape of the hot-air balloon is close to a circle, which is convenient for the subsequent formation of a circular display area. In the part near the first edge, the shape is roughly parallel to the first edge, which is convenient for the arrangement of devices such as light sources.

In some embodiments, as shown in FIG. 9 and FIG. 14, the light guide plate, the reflector, the diffuser, the prism, and the DBEF each has a shape that matches the second groove, therefore these film elements can be effectively limited and fixed using the second groove of the rubber frame without the need for other fixation methods, thereby simplifying the manufacturing process.

In some embodiments, there is a gap between the light guide plate, reflector, diffuser, prism, and DBEF and the rubber frame, which leaves a certain margin for possible deformation of the rubber frame and can still maintain device stability when deformation occurs. Here, there is no specific limit on the specific position of the gap. It can be a gap between the edge of the entire element and the edge of the first groove, or it can be a gap only between the edge of a certain part of the element and the edge of the first groove, as long as there is a "gap". The size of the gap can be 0.15 mm, for example.

In some embodiments, the display panel is arranged in a groove surrounded by flange 5102, the groove may be formed by a flange 5102 connected end-to-end, or the groove may be formed by flanges 5012 in some positions as a limiting element. The groove prevents the display panel from moving or has a limited movement distance in the direction parallel to the back plate substrate.

Figure 18:
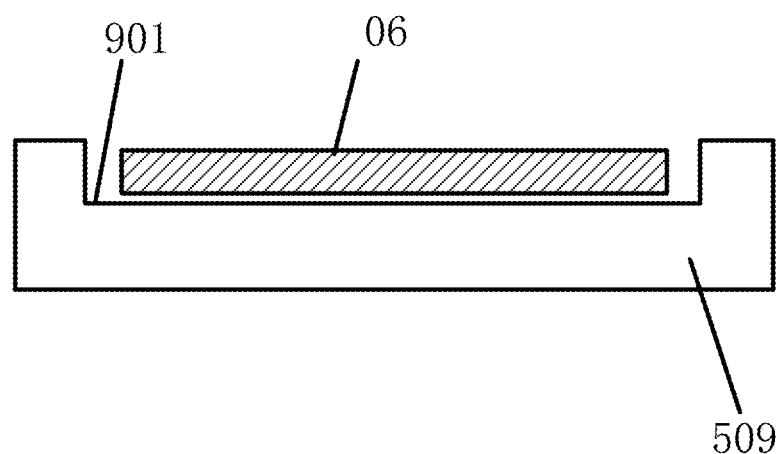
FIG. 18 schematically shows a cross-sectional view of the display device along a first edge direction according to an embodiment of the present disclosure.

In some embodiments, for example, FIG. 18 shows a cross-sectional schematic diagram along the first edge direction. The rubber frame 509 is provided with a first opening 901 at the first edge, and the first circuit board 06 is electrically connected to the display panel through the first opening 901.

Figure 19:
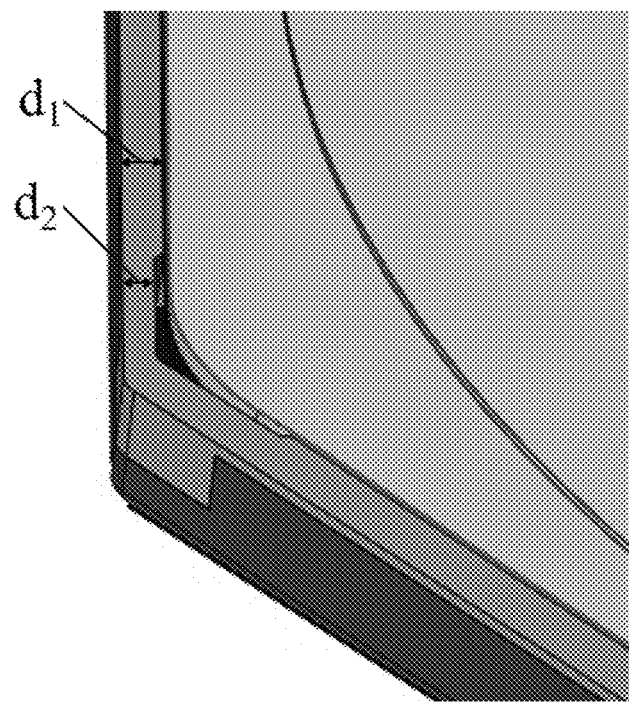
FIG. 19 schematically shows a view near a vertex of the display device according to an embodiment of the present disclosure.

In some embodiments, the rubber frame includes a top surface of the rubber frame. In the direction perpendicular to the back plate substrate, the rubber frame at different positions can have different heights (for example, the height of the rubber frame at the first opening is low), and each surface of the rubber frame farthest from the back plate substrate at each position integrally forms the top surface of the rubber frame. As shown in FIG. 19, in a plane parallel to the back plate substrate, the top surface of the rubber frame has at least a first thickness d1 and a second thickness d2 in a direction perpendicular to the edge of the polygon. The first thickness d1 is greater than the second thickness d2; the distribution position of the second thickness d2 on the rubber frame is closer to the vertices of the polygon compared to the first thickness d1. By setting a smaller second thickness near the vertex of the polygon, there can be a certain distance between the display panel and the rubber frame. During the assembly, transportation, and use of the display device, this distance can avoid excessive compression and damage to the display panel, thereby improving the stability and reliability of the display device.

In some embodiments, as shown in FIG. 19, flange 5102 may not be arranged near the vertices of the polygon, and the rubber frame at the corresponding positions may be arranged to fill the space with no flange to make the outer contour of the display device flat. Due to the fact that the back plate substrate is usually made of metal, it is difficult to fold the two edges adjacent to a vertex. Through this design, the manufacturing process can be simplified. At the same time, the part of the rubber frame that fills the gap between adjacent flanges further increases the fixation fastness between the back plate and the rubber frame.

In some embodiments, as shown in FIG. 10a and FIG. 10b, a light shading sheet 512 may be provided on a side of the plurality of first light sources 505 away from the back plate substrate. Preferably, the orthographic projection of the shading sheet on the back plate substrate covers the orthographic projection of the plurality of first light sources on the back plate substrate. The shading sheet can prevent the light emitted by the light source from directly leaking out of the backlight plate, affecting display uniformity. As shown in FIG. 10a and FIG. 10b, the orthographic projection of the first groove 5091 on the back plate substrate is within the orthographic projection of the second groove 5092 on the back plate substrate, and the part of the shading sheet 512 near the first edge can be attached to the bottom surface of the second groove 5092 by using adhesive tape, for example.

In some embodiments, the outer contour of the display panel is the same as the outer contour of the display device. It should be noted that the outer contour of the display panel is the same as the outer contour of the display device, which may include the case that the vertex positions of the polygon are different when the outer contour is a polygon. For example, one of the outer contour of the display panel and the outer contour of the display device may be a rectilinear polygon, and the other may be a rounded polygon. For example, the outer contour of the display panel and the outer contour of the display device are both rounded polygons, and at least one vertex has different curvatures.

In some embodiments, the outer contour of the functional panel is the same as that of the display device. It should be noted that the outer contour of the functional panel is the same as the outer contour of the display device, which may include the case that the vertex positions of the polygon are constructed differently when the outer contour is a polygon. In some embodiments, the outer contour of the functional panel overlaps or basically overlaps with the outer contour of the display device, ensuring the aesthetic appearance of the display device. In some embodiments, the functional panel is arranged in a groove surrounded by the flange 5102. In some embodiments, the outer contour of the functional panel overlaps or basically overlaps with the outer contour of the display panel. The above basically overlap case includes the following situations: except for the different vertex positions of the polygon, the outer contours of other parts overlap.

In some embodiments, as shown in FIG. 10, a conductive tape 503 may be arranged on a side of the plurality of first light sources 505 away from the back plate substrate. The conductive tape can conduct away the charges that may be generated by the display device, thus ensuring the stability of the display device. Optionally, the orthographic projection of the conductive tape on the back plate substrate covers the orthographic projection of the plurality of first light sources on the back plate substrate, so that the conductive tape can not only conduct away the charges that may be generated by the circuit structure of the light sources, but also further block the light directly emitted upward by the light sources, and improve the light emitting effect.

In some embodiments, as shown in FIG. 9 and FIG. 10, the backlight plate may also include a light blocking tape 501 on a side of the light exiting surface of the light guide plate 507. The light blocking tape includes an opening, and the shape of the opening can be the same as the shape of the display area of the display device. The light blocking tape 501 is used to block the light emitted from non-display areas and improve the display effect. When the backlight plate includes film elements such as a diffuser, a prism, and a DBEF, the light blocking tape 501 is on a side of the element farthest from the light exiting surface of the light guide plate 507 away from the light exiting surface of the light guide plate 507.

In some embodiments, as shown in FIG. 9, the backlight plate may also include a double-sided tape 511, which is bonded to a side of the backlight plate 510 away from the display panel for fixing the backlight plate during assembly.

Figure 15:
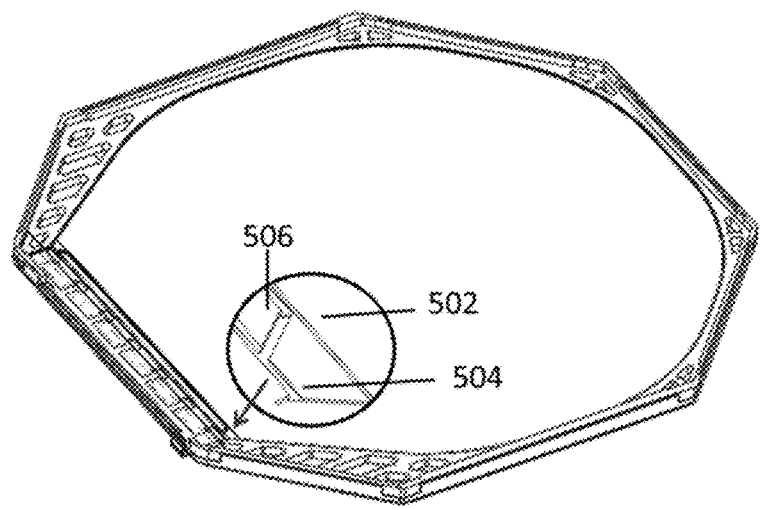
FIG. 15 schematically shows a three-dimensional view of a backlight plate according to an embodiment of the present disclosure.

In some embodiments, in order to distinguish various film elements, as shown in FIG. 14, the diffuser 506, the prism 504, and the DBEF 502 may have different shapes near the edge of the light source. For example, the edge of the diffuser 506 may include a slender rectangle, the edge of the prism 504 may include two sharp corners, and the edge of the DBEF 502 may include one sharp corner. By designing different features at the edges of each film elements, it is easy to distinguish different film elements and prevent incorrect arrangement of each film element during assembly. This design is often referred to as foolproof design. Optionally, different chamfering treatments can be performed on the two side edges of the film element to better distinguish the front and back sides of each film element. FIG. 15 schematically shows a three-dimensional view of a backlight plate according to an embodiment of the present disclosure, where the enlarged figure in the circle shows the edges of the diffuser 506, the prism 504, and the DBEF 502 with different structures.

Figure 17:
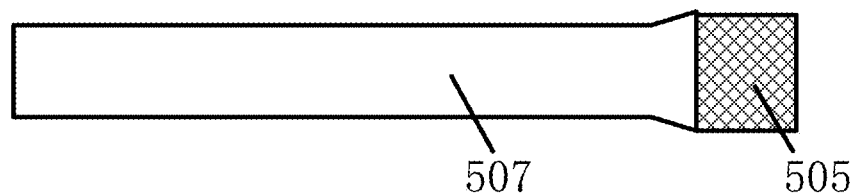
FIG. 17 schematically shows a cross-sectional view of the light source and the backlight plate according to an embodiment of the present disclosure.

In some embodiments, on a cross-section perpendicular to the back plate substrate and perpendicular to the first edge, as shown in FIG. 17, the height of the light entrance surface of the light guide plate 507 is greater than or equal to the height of the plurality of first light sources 505. This design ensures that all light emitted by the light source can enter the light guide plate, improving the utilization rate of light and also improving the brightness of the light out of the backlight plate. Preferably, the height of the light entrance surface of the light guide plate 507 is greater than the height of the plurality of first light sources 505. Preferably, the light entrance surface of the light guide plate 507 is in a "bell mouth" shape, ensuring that all light emitted by the light source can enter the light guide plate. Optionally, the height of the first light source 505 is greater than the average height of the light guide plate 507.

The display device provided in the first aspect of the present disclosure may include the backlight plate provided in the second aspect of the present disclosure, so that the display device not only has the beneficial effects provided in the first aspect of the present disclosure, but also has the beneficial effects provided in the second aspect of the present disclosure, which will not be repeated here.

According to a third aspect of the present disclosure, there is also provided an electronic device comprising the display device mentioned above. The electronic device includes but is not limited to household appliances such as washing machines, water dispensers, refrigerators.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another. Thus, a first element, component, region, layer or section discussed below could be termed a second element, component, region, layer or section without departing from the teachings of the present invention.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. Terms such as "before" or "preceding" and "after" or "followed by" may be similarly used, for example, to indicate an order in which light passes through the elements. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present. In no event, however, should "on" or "directly on" be construed as requiring a layer to completely cover an underlying layer.

Embodiments of the invention are described herein with reference to schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. Accordingly, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

What is claimed is:

1. A display device with an outer contour of a polygon, comprising:
    a display panel;
    a functional panel on a side of a light exiting surface of the display panel;
    a first circuit board electrically connected to the display panel and bent at a first edge of the polygon to a side of the display panel away from the light exiting surface of the display panel; and
    a second circuit board electrically connected to the functional panel and bent at a second edge of the polygon to the side of the display panel away from the light exiting surface of the display panel,
    wherein the first edge and the second edge are different edges, and an orthographic projection of the first circuit board on the light exiting surface of the display panel does not overlap with an orthographic projection of the second circuit board on the light exiting surface of the display panel,
    wherein the display device further comprises a backlight plate on the side of the display panel away from the light exiting surface, the backlight plate comprises a rubber frame and a back plate, and the rubber frame is on a side of the back plate facing the display panel, and the rubber frame and back plate are integrally formed through an inser-molding injection process.

2. The display device according to claim 1, wherein the first circuit board comprises a first lead portion, the second circuit board comprises a second bending portion and a second lead portion, and the second bending portion is close to the second edge; wherein the first lead portion extends in a same direction as the second lead portion.

3. The display device according to claim 2, wherein the second circuit board further comprises an electronic device carrying portion, one end of the electronic device carrying portion is electrically connected to the second bending portion, and the other end is electrically connected to the second lead portion.

4. The display device according to claim 1, wherein the polygon is an octagon.

5. The display device according to claim 1, wherein the back plate comprises a back plate substrate and a flange adjacent to an edge of the back plate substrate, wherein the flange corresponds to at least one edge of the outer contour of the polygon.

6. The display device according to claim 5, wherein the back plate substrate comprises a plurality of first through holes, each first through hole is filled with a first filling portion, a material of the first filling portion is the same as a material of the rubber frame, and the first filling portion and the rubber frame form an integrated structure, and/or the flange comprises a plurality of second through holes, each second through hole is filled with a second filling portion, a material of the second filling portion is the same as the material of the rubber frame, and the second filling portion and the rubber frame form an integrated structure.

7. The display device according to claim 1, wherein the display device comprises:
a first groove and a second groove surrounded by the rubber frame, and an opening surface of the first groove and a bottom surface of the second groove are coplanar.

8. The display device according to claim 7, wherein the rubber frame is provided with a plurality of third through holes.

9. The display device according to claim 7, wherein the backlight plate comprises a backlight, and the backlight is arranged in the first groove.

10. The display device according to claim 9, wherein the backlight comprises a plurality of first light sources and a light guide plate, orthographic projections of the light guide plate and the plurality of first light sources on the back plate substrate do not overlap, the plurality of first light sources are on a side of the first edge, and the plurality of first light sources are sequentially arranged in a direction parallel to the first edge.

11. The display device according to claim 10, wherein the backlight plate further comprises a diffuser, a prism, and a DBEF arranged sequentially in a light output direction of the light guide plate.

12. The display device according to claim 11, wherein the diffuser comprises a diffuser body and a diffuser flange at an edge of the diffuser body, wherein a thickness of the diffuser flange is greater than or equal to a thickness of the prism, or, the thickness of the diffuser flange is greater than or equal to a sum of the thickness of the prism and the DBEF.

13. The display device according to claim 11, wherein the diffuser, the prism, and the DBEF are all arranged in the second groove.

14. The display device according to claim 11, wherein the light guide plate, the reflector, the diffuser, the prism, and the DBEF each has a shape that matches the second groove, and there is a gap between them and the rubber frame.

15. The display device according to claim 1, wherein the rubber frame is provided with a first opening at the first edge, and the first circuit board is electrically connected to the display panel through the first opening.

16. The display device according to claim 1, wherein the rubber frame comprises a top surface of the rubber frame, in a plane parallel to the back plate substrate, along a direction perpendicular to an edge of the polygon, the top surface of the rubber frame has at least a first thickness and a second thickness;
wherein the first thickness is greater than the second thickness; the distribution position of the second thickness on the rubber frame is closer to the vertices of the polygon compared to the first thickness.

17. The display device according to claim 10, wherein a light shading sheet is provided on a side of the plurality of the first light sources away from the back plate substrate, an orthographic projection of the light shading sheet on the back plate substrate covers an orthographic projection of the plurality of first light sources on the back plate substrate, and the orthographic projection of the first groove on the back plate substrate is within an orthographic projection of the second groove on the back plate substrate, a part of the light shading sheet is attached to the bottom surface of the second groove.

18. An electronic device, comprising a display device according to claim 1.

19. A display device with an outer contour of a polygon, comprising:
a display panel;
a functional panel on a side of a light exiting surface of the display panel;
a first circuit board electrically connected to the display panel and bent at a first edge of the polygon to a side of the display panel away from the light exiting surface of the display panel; and
a second circuit board electrically connected to the functional panel and bent at a second edge of the polygon to the side of the display panel away from the light exiting surface of the display panel,
wherein the first edge and the second edge are different edges, and an orthographic projection of the first circuit board on the light exiting surface of the display panel does not overlap with an orthographic projection of the second circuit board on the light exiting surface of the display panel,
wherein the first circuit board comprises a first lead portion, the second circuit board comprises a second bending portion and a second lead portion, and the second bending portion is close to the second edge; wherein the first lead portion extends in a same direction as the second lead portion, and the first lead portion, the second bending portion and the second lead portion are on the side of the display panel away from the light exiting surface of the display panel.

* * * * *